United States Patent Office 3,532,757
Patented Oct. 6, 1970

3,532,757
POLYPHOSPHINE COMPOUNDS AND PROCESS
Max van Ghemen and Egon Wiberg, Munich, Germany, assignors to Hooker Chemical Corporation, Niagara Falls, N.Y., a corporation of New York
No Drawing. Original application May 22, 1963, Ser. No. 282,218, now Patent No. 3,471,568, dated Oct. 7, 1969. Divided and this application June 2, 1969, Ser. No. 843,259
Int. Cl. C07f 7/02, 9/28; B01j 1/16
U.S. Cl. 260—606.5                  10 Claims

ABSTRACT OF THE DISCLOSURE

This invention relates to hexaphenyldecaphosphine derivatives useful as antioxidants and pre-ignition suppressants for lubricating oils and gasoline.

---

This application is a division of application S.N. 282,218 filed May 22, 1963 now U.S. Pat. No. 3,471,568.

The present invention relates to organophosphorus compounds and to the preparation of the same. More particularly, the invention is concerned with certain organophosphorus compounds containing at least six phosphorus atoms and to processes for preparing them.

There have been numerous successful attempts to synthesize phosphine derivatives and diphosphines of the formula:

$$R_2P—PR_2$$

However, only a very little is known about the synthesis of polyphosphines. Triphosphines ($P_3H_5$) have recently been formed by a spectroscopic method as degradation products of diphosphines (Naturwissenschaften 46, 578 (1959).

In accordance with the present invention, organophosphorus compounds containing six phosphorus atoms are prepared by the reaction of alkali metal phosphines with a halophosphine or an oxyhalophosphine. The reactions occurring can best be illustrated by the following typical equations:

(1) $6R'_nA_1PM_2 + 4PX_3 \rightarrow 12MX + P_{10}(A_1R'_n)_6$
(2) $6R'_nA_1PM_2 + 4POX_3 \rightarrow 12MX + P_{10}O_4(A_1R'_n)_6$
(3) $P_{10}(A_1)_6R' + 4R'_nA_1SiX_3 \rightarrow (R'_nA_1)_{10}Si_4P_6 + 4PX_3$ wherein:
(a) R' is selected from the group consisting of hydrogen, halogen, alkyl, alkoxy, aryloxy and acyloxy;
(b) $A_1$ is phenyl;
(c) M is alkali metal;
(d) X is a halogen selected from the group consisting of chlorine, bromine and iodine; and
(e) n represents the number of R' substituents attached to the core structure $A_1$.

Illustrative examples of the R' substituents included within the present invention are:
(a) Alkyl, usually of one to eighteen, preferably of one to six carbon atoms, such as methyl, ethyl, propyl, butyl, octyl, stearyl, and the like;
(b) Alkoxy, preferably of one to six carbon atoms, such as methoxy, ethoxy, propoxy, butoxy, ethoxyethoxy, and the like;

(c) Aryloxy, preferably to one to thirty carbon atoms, such as phenoxy, diphenoxy, and the like;
(d) Acyloxy of one to forty, preferably of one to six carbon atoms, such as diacetoxy, distearyloxy, and the like;
(e) Halogen selected from the group consisting of fluorine, chlorine, bromine, and iodine. The substituent R' is preferably chlorine for reasons of cost; and
(f) Hydrogen.

It is to be appreciated that the R', substituent may be any radical, which, under the conditions of the reaction herein, is inert and does not affect the reaction mechanism.

The letter n represents the number of R' substituents attached to the core structure $A_1$, said n depending on the number of $A_1$ radicals present. The substituent a preferably has a value of from zero to fifty. It is, of course, appreciated that it may be higher, depending on the number of $A_1$ radicals present.

The substituent M is an alkali metal, such as sodium, potassium, lithium, and the like.

The reaction temperature employed in the processs of the invention is usually below zero degrees centigrade. Temperatures as low as about −80 degrees centigrade have been employed. Other temperatures can also be employed which will not adversely affect the reaction.

Pressure is conveniently about or below atmospheric, however, other pressures may be utilized which will not adversely affect the reaction mechanism.

The mole ratio of reagents is preferably about six moles of alkali metal phosphine to four moles of the halophosphine, or oxyhalophosphine. Other molar ratios, however, can be employed without departing from the scope of the invention.

The products of the invention are generally isolated by filtration and are purified by recrystallization, although other methods of purification and separation can be used.

Novel compounds of the present invention can be described by the following formula:

$$P_y(A_1R'_n)_z(R'')_w$$

wherein:
(a) $A_1$ is phenyl;
(b) z is an integer selected from the group consisting of six and ten;
(c) y is an integer selected from the group consisting of six and ten;
(d) R' is selected from the group consisting of hydrogen, halogen, alkyl, alkoxy, aryloxy, and acyloxy;
(e) n represents the number of R' substituents attached to the core structure $A_1$;
(f) P is selected from the group consisting of oxygen, silicon and sulfur; and
(g) w is an integer selected from the group consisting of zero and four.
(h) Said integer z is six when y is ten and said integer z is ten when the substituent P is silicon.

The following structures are suggested for some of the products prepared by the process of the present invention, but the invention is not to be considered as limited thereto:

The following equations will further illustrate the invention. They are not intended to be limiting:

(1) $6C_6H_5PLi_2 + 4PCl_3 \xrightarrow{-78°C.} P_{10}(C_6H_5)_6 + 12LiCl$ (2) $6C_6H_5PNa_2 + 4POCl_3 \xrightarrow{-78°C:} P_{10}(C_6H_5)_6 + 12NaCl$ (3) $P_{10}(C_6H_5)_6 + C_6H_5SiCl_3 \longrightarrow P_6Si_4(C_6H_5)_{10}$ In another aspect of the present invention $P_{10}(A_1)_6R'_n$ is reacted with a sulfur-containing material, such as sulfur itself, thereby resulting in the production of a compound having the formula $P_{10}(A_1)_6R'_nS_4$ wherein the substituents are as defined herein.

(1) $P_{10}(C_6H_5)_6$

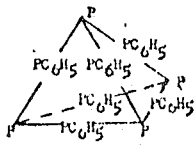

(2) $(C_6H_5)_6P_{10}O_4$

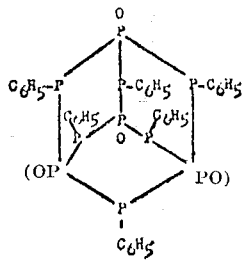

(3) $P_6Si_4(C_6H_5)_{10}$

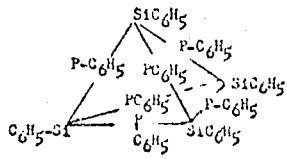

The compounds of this invvention are useful as antioxidants in gasoline. Further, the compounds may also be incorporated in small amounts in motor fuels, such as gasoline, which contain tetraethyl lead to suppress pre-ignition firing. They are also useful as lubricant additives to motor oils.

The following illustrative examples will serve to more fully describe the invention. Unless otherwise noted, the parts are given by weight and the temperatures are in degrees centigrade.

EXAMPLE 1

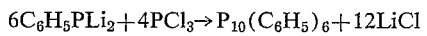

136 milliliters of a 1.76 normal (239.4 millimoles) solution of butyllithium in ether were added drop-wise at room temperature to 13.20 grams of phenylphosphine $(C_6H_5PH_2)$ in 25 milliliters of ether to yield 119.9 millimoles of dilithiumphenylphosphine $(C_6H_5PH_2)$. The yellow suspension of $C_6H_5PLi_2$ was then cooled to −78 degrees centigrade and a solution of 11.01 grams of phosphorus trichloride $(PCl_3)$ in 13 milliliter of ether was added slowly. A vigorous reaction occurred and a yellow precipitate formed. The resultant mixture was then warmed up to room temperature, and filtered. The insoluble portion on the filter was washed with water to remove lithium chloride. The resultant product was identified as $P_{10}(C_6H_5)_6$ by infrared analysis.

*Analysis.*—Calculated: P, 40.10 percent; molecular weight 774.7. Found: P, 40.08 percent; molecular weight 772.4.

The product was found to be soluble in benzene, toluene, xylene, methylene chloride and like solvents.

EXAMPLE 2

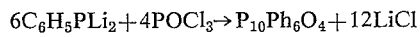

13.8782 grams (90.5 millimoles) of phosphorus oxy-trichloride, $POCl_3$, was dissolved in ether and was added at −78 degrees centigrade to a solution of 138.6 millimoles of dilithium phenylphosphine $(C_6H_5PLi_2)$, which was prepared as described in Example 1. The reaction proceeded similarly as described in Example 1. The yellow product, which was obtained, is soluble in benzene. Tetrahydrofuran, dioxane, chloroform, slightly soluble in ether, insoluble in hexane.

*Analysis.*—Calculated for $P_{10}Ph_6O_4$: P, 37.03 percent, molecular weight 836.4. Found: P, 36.87 percent, molecular weight 830.8.

EXAMPLE 3

In a manner similar to Examples 1 and 2, an equivalent amount of hexaphenyldecaphosphine $P_{10}(C_6H_5)_6$ and tri-chlorophenylsilicon $(C_6H_5SiCl_3)$ were reacted in an ethereal solution at −78 degrees centigrade. A white precipitate formed and contained all the chloride of the lithium chloride that was employed as evidenced by titration. This white precipitate was filtered off, and the pale yellow ethereal solution evaporated to dryness under a vacuum. The residue was a pale yellow solid substance, which was free of halogen. It was soluble in ether, benzene, acetone and carbon tetrachloride. The substance had a melting point of around 75 degrees centigrade.

*Analysis.*—Calculated (percent): P, 17.4; C, 67.40; H, 4.71. Molecular weight 1069. Found (percent): P, 14.8 to 15.1; C, 65.17; H, 5.63. Molecular weight 1010.

EXAMPLE 4

Also in a process like that of the above example, hexaphenyldecaphosphine $(P_{10}(C_6H_5)_6)$ was dissolved in excess sulphur. The resultant product was a white powder and the ratio of P:S indicated it to be of the formula $P_{10}(C_6H_5)_6S_4$.

The compounds of the above examples are added in small amounts to gasoline and oils as pre-ignition inhibitors and antioxidants.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A compound of the formula

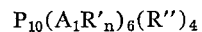

wherein:
(a) $A_1$ is phenyl;
(b) R′ is a substituent of $A_1$ selected from the group consisting of —H, —F, —Cl, —Br, —I, alkyl of 1–18 carbon atoms, alkoxy of 1–6 carbon atoms, aryloxy of 1–30 carbon atoms, and acyloxy of 1–40 carbon atoms;
(c) $n$ represents the number of groups R′ attached to $A_1$;
(d) R″ is a P substituent selected from the group consisting of oxygen and sulfur.

2. A compound of 1 in which R′ is a substituent of $A_1$ selected from the group consisting of —H, —Cl, alkyl of 1 to 6 carbon atoms, alkoxy of 1 to 6 carbon atoms, aryloxy of 1 to 30 carbon atoms, and acyloxy of 1 to 6 carbon atoms.

3. A compound of claim 1 in which R″ is sulfur.
4. A compound of claim 1 in which R″ is oxygen.
5. The compound $P_{10}O_4(C_6H_5)_6$.
6. The compound $P_{10}S_4(C_6H_5)_6$.
7. A process for the preparation of a compound of the formula

which comprises reacting a compound of the formula $R'_nA_1PM_2$ with $POX_3$, wherein
(a) $A_1$ is phenyl;

(b) R' is a substituent of $A_1$ selected from the group consisting of —H, —F, —Cl, —Br, —I, alkyl of 1–18 carbon atoms, alkoxy of 1–6 carbon atoms, aryloxy of 1–30 carbon atoms and acyloxy of 1–40 carbon atoms;

(c) $n$ represents the number of groups R' attached to $A_1$;

(d) M is an alkali metal, and (e) X is selected from the group consisting of chlorine, bromine and iodine.

8. A process for the preparation of a compound of the formula $P_{10}O_4(C_6H_5)_6$ comprising reacting $POCl_3$ with $C_6H_5PLi_2$.

9. A process for the preparation of a compound of the formula $P_{10}(A_1R'_n)_6S_4$ comprising reacting a compound of the formula $P_{10}(A_1R'_n)_6$ with sulfur, wherein (a) $A_1$ is phenyl;

(b) R' is a substituent of $A_1$ selected from the group consisting of —H, —F, —Cl, —Br, —I, alkyl of 1–18 carbon atoms, alkoxy of 1–6 carbon atoms, aryloxy of 1–30 carbon atoms, and acyloxy of 1–40 carbon atoms; and (c) $n$ represents the number of groups R' attached to $A_1$.

10. A process for the preparation of a compound of the formula $P_{10}(C_6H_5)_6S_4$ which comprises reacting $P_{10}(C_6H_5)_6$ with sulfur.

References Cited

UNITED STATES PATENTS 3,471,568  10/1969  Van Ghemen et al. __ 260—606.5

TOBIAS E. LEVOW, Primary Examiner

W. F. W. BELLAMY, Assistant Examiner

U.S. Cl. X.R.

252—406, 407; 260—448.2